Figure 1:
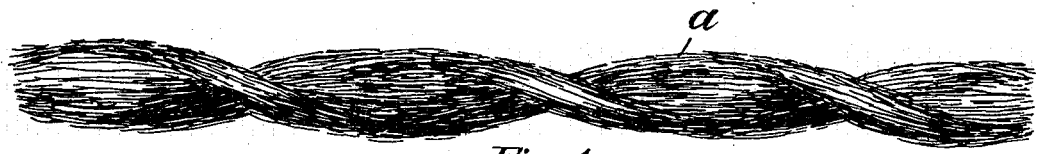

(No Model.)   3 Sheets—Sheet 1.

E. MAERTENS.
MANUFACTURE OF COLORED TOPS OR SLIVERS FROM COMBED ANIMAL FIBERS.

No. 507,232.   Patented Oct. 24, 1893.

Witnesses:
Grosafette Sicoli
Ida M. Warren

Inventor:
Emile Maertens.
by Remington & Henthorn
Attys.

(No Model.) 3 Sheets—Sheet 2.

E. MAERTENS.
MANUFACTURE OF COLORED TOPS OR SLIVERS FROM COMBED ANIMAL FIBERS.

No. 507,232. Patented Oct. 24, 1893.

Witnesses:
Giosafatte Sicli
Ida M. Warren

Inventor:
Emile Maertens.
by Remington & Henthorn
Attys (No Model.)   3 Sheets—Sheet 3.

E. MAERTENS.
MANUFACTURE OF COLORED TOPS OR SLIVERS FROM COMBED ANIMAL FIBERS.

No. 507,232.   Patented Oct. 24, 1893.

Witnesses:
Ginsafatte Sicoli
Ida M. Warren

Inventor:
Emile Maertens.
by Remington & Henthorn
Attys.

UNITED STATES PATENT OFFICE.

EMILE MAERTENS, OF PROVIDENCE, RHODE ISLAND.

MANUFACTURE OF COLORED TOPS OR SLIVERS FROM COMBED ANIMAL FIBERS.

SPECIFICATION forming part of Letters Patent No. 507,232, dated October 24, 1893.

Application filed June 22, 1892. Serial No. 437,643. (No specimens.)

*To all whom it may concern:*

Be it known that I, EMILE MAERTENS, a citizen of the United States, residing at Providence, in the county of Providence and State of Rhode Island, have invented certain new and useful Improvements in the Manufacture of Colored Tops or Slivers from Combed Animal Fibers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The subject of my present invention relates to improvements in the manufacture of colored tops or slivers from combed animal fibers, and it consists essentially in winding a combed and twisted sliver upon a suitable holder, then dyeing or chemically treating the thus mounted sliver and then unwinding and untwisting the treated sliver from the holder, all as will be hereinafter described.

The object I have in view is to produce colored tops or sliver in a more perfect, expeditious and less expensive manner than the present existing methods of manufacturing such product.

I would state in explanation that "tops" is the technical and commercial name given to a combed sliver or ribbon composed of long textile fibers, as for example wool, alpaca, mohair, camel's hair and other analogous animal fibers, and being the product delivered from the combing machine; the latter as is well known is employed to separate or extract the "noils" or short fibers and foreign matter from the fibrous material and at the same time comb the merchantable portion into a continuous ribbon or sliver, as just stated, and as is well known to manufacturers of such product. For convenience in handling, storing and shipping, these slivers after being gilled are wound into balls, and in general practice such balls are termed "tops." Although it is not necessary for the combed sliver to be balled in order to be properly called tops (the latter being the technical name for fibers from which noils, &c., have been extracted, as before explained) yet it is a common practice to ball it. It has hitherto been usual to comb all fibers intended for colored top making, after they have been dyed, whether they had been combed previous to dyeing or not; and in general practice it has been found most economical to dye combed fibers for the production of colored tops, for reasons well known to practical manufacturers. But such former processes and manipulations necessarily called-for a recombing of the fibers in order to produce commercially salable tops on account of the felting and roughing up of the fibers, due to the processes of scouring, dyeing, and drying.

By means of my improvement the manipulation is such that the fibers are neither felted nor disturbed from their normal or parallel position while the material is being chemically treated and dried, thereby successfully avoiding the recombing process, and consequently saving a large amount of waste, labor and expense.

In carrying out my invention, I take an ordinary combed sliver or top which I twist into roping, or draw and twist it into roping, and then wind it upon a suitable holder or spool where it remains undisturbed during the processes of dyeing and drying. I next take the thus dyed and dried sliver and unwind it from the holder into a ball or upon a bobbin, after which I untwist the sliver, at the same time running it into a can or winding it upon another bobbin. Or if desired the sliver may be untwisted and run into a can or wound upon a bobbin direct from the holder upon which it was dyed without being previously wound into balls. The untwisted slivers are then gilled and balled in the ordinary way of top making in the same manner as if they had just left the comb, or they can be drawn and run into a can or wound upon a bobbin or into a ball without being previously gilled, as best suits the purpose of the manufacturer.

Figure 2:
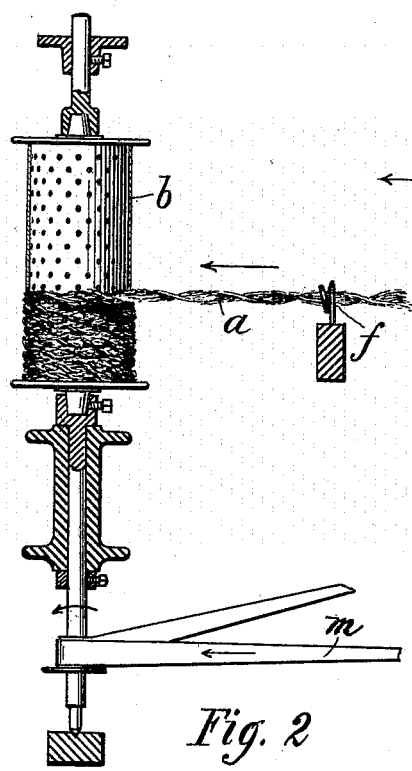
Figure 3:
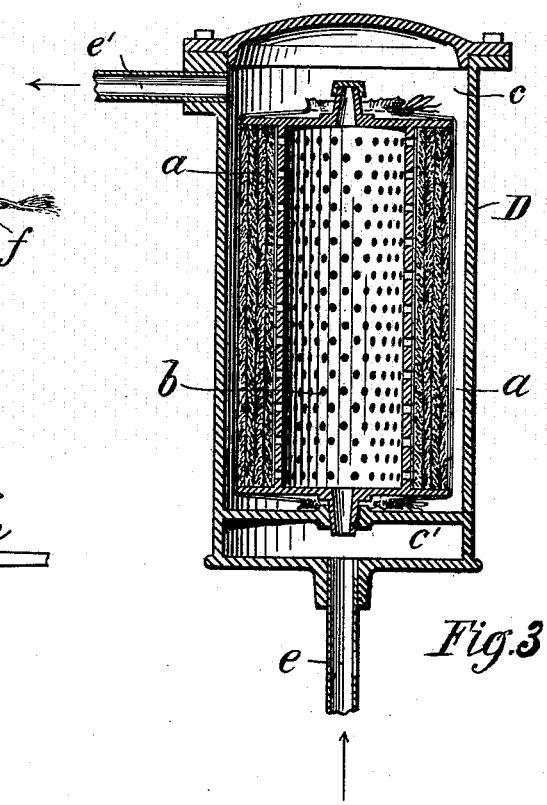
Figure 4:
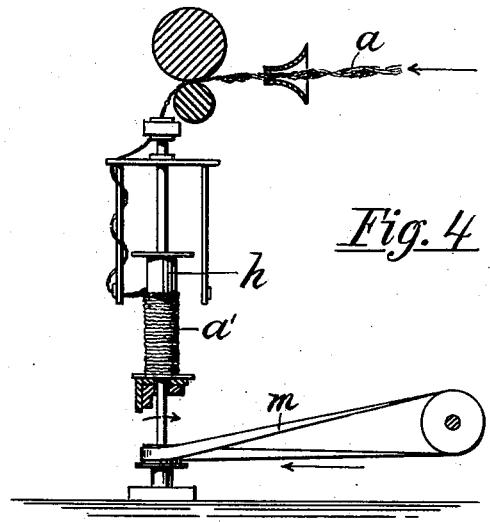
Figures 5, 6:
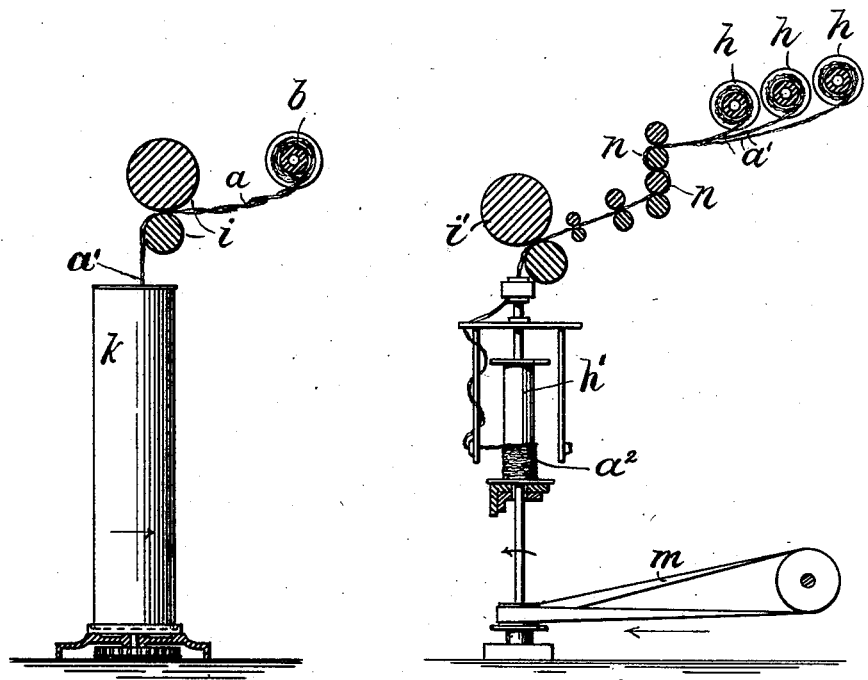
Figure 7:
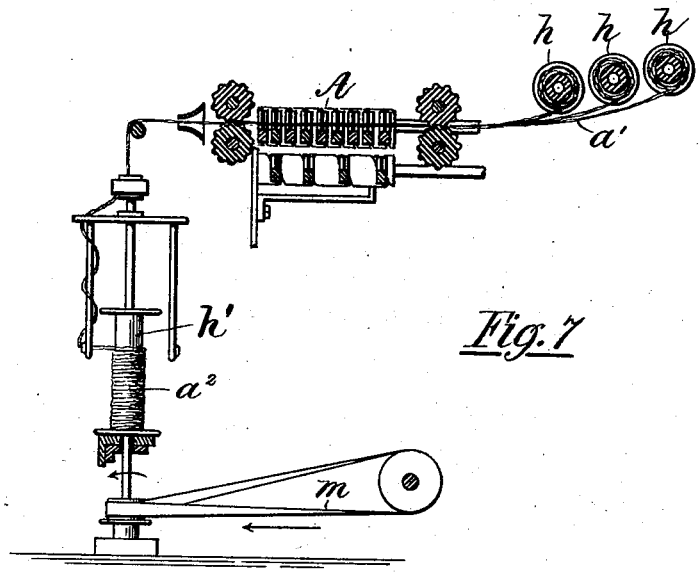
Figure 8:
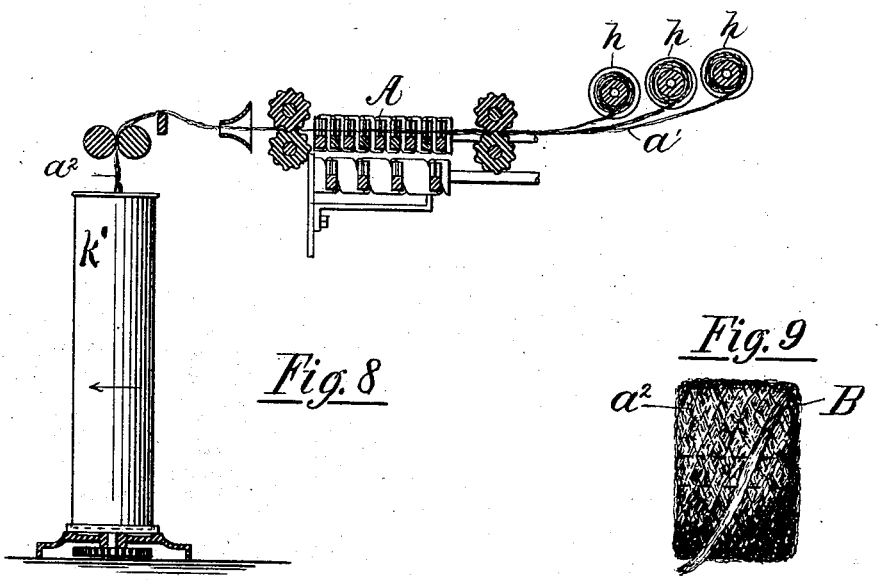
Figure 9:
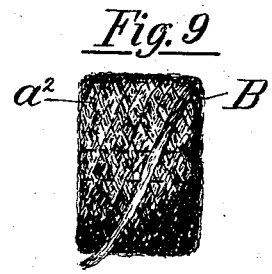

In the accompanying three sheets of drawings illustrating my invention, Figure 1, is a side elevation of a twisted combed sliver made from animal fibers. Fig. 2 is a side elevation, in reduced scale, in partial section, showing a manner of winding said sliver upon a perforated spool or holder preparatory to chemically treating it. Fig. 3 is a vertical central sectional view, showing the thus loaded holder mounted in a treating keir. Fig. 4, is a side elevation, in partial section, showing mechanism for untwisting the treated and dried sliver and winding it upon a spool or bobbin. Fig. 5 is a similar view, showing a manner of unwinding the treated sliver from the holder and at the same time untwisting it into a revolving can. Fig. 6 is a side elevation, also in partial section, showing a manner of combining two or more of the treated and untwisted slivers and drawing the resulting sliver in a twisted form upon a bobbin. Fig. 7, is a side elevation similar to that last described, showing two or more of the untwisted slivers combined and passing through a gill-box from whence it is wound upon a bobbin. Fig. 8 represents the same as Fig. 7, except that the resulting sliver is delivered into a can, and Fig. 9 represents the slivers, produced by the mechanisms shown in Figs. 7 and 8, balled into a top.

In carrying out my invention the undyed combed animal fibers are first coarsely twisted into a sliver or roping $a$ and then wound upon the perforated barrel of a suitable holder or spool, as $b$, Fig. 2. The latter is next mounted in a closed keir, where the sliver is chemically treated in any well known manner.

D, Fig. 3, indicates a keir adapted for the purpose referred to; in this case the treating liquids enter a distributing chamber $c'$ at the bottom via the inlet pipe $e$, and pass upwardly therefrom into the perforated barrel of the holder $b$; the latter being mounted in the upper or main chamber $c$. The treating liquor is next passed through the perforations of the barrel and through the sliver wound thereon into the main chamber, and from the latter to the discharge pipe $e'$. The pipes $e$ $e'$ may be connected with a pump or other mechanism arranged to force the liquor through the sliver or material $a$ under treatment. The liquor may be automatically circulated to and fro intermittingly at certain pre-arranged intervals of time if desired. After the dyeing operation has been effected, the sliver, while still mounted upon the holder $b$, is next dried by means of the introduction and circulation of hot air through the pipes $e$, $e'$, and the connected keir; or the loaded holder may be removed from the keir and the drying operation accomplished in any well known manner.

From the foregoing it is apparent that the fibers are not roughed up or disturbed in any manner from the time the sliver is wound upon the holder until after the drying process, as all handling of the sliver is avoided. Consequently the normal parallelism of the fibers is unaffected. By reason of this result it is obvious that a recombing of the sliver is rendered unnecessary, thereby resulting in a consequent saving of a large percentage of waste and the labor and expense incidental to recombing.

After the sliver or roping has been dried I unwind it from the holder into a ball or upon a bobbin, following this by untwisting it, or it can be untwisted simultaneously with the operation of unwinding, as indicated in Figs. 4 and 5. In the former figure the twisted and treated sliver $a$ is fed to a suitable flier which in connection with a properly revolving bobbin $h$ operates to remove the twist from the sliver and winds the latter untwisted upon the bobbin; the sliver in this form being indicated by $a'$. In Fig. 5 the direction of rotation of the can $k$ serves to untwist the treated sliver $a$ and coil it into the can. Two or more of the untwisted slivers $a'$ are next combined and drawn into a single sliver $a^2$ by suitable drawing rolls, &c., as indicated in Fig. 6. The rotation of the flier and bobbin $h'$ acts to wind the sliver upon the bobbin and at the same time impart the desired degree of twist.

In some cases a series of untwisted slivers $a'$ are combined and the resulting sliver is next passed through a gill-box, as A, Fig. 7, from which it emerges and is then conducted to a rotating flier and wound upon the bobbin $h'$, as before described. In lieu of the arrangement last referred to a rotating can $k'$ may be substituted for the bobbin and flier, in which case the sliver $a^2$ runs into the can, the latter giving it the necessary twist, as indicated in Fig. 8.

The dyed sliver $a^2$ may be readily run into a ball B, Fig. 9, to form "tops" by simply substituting a balling machine for the bobbin $h'$ and flier Figs. 6 and 7, and the can $k'$, Fig. 8.

I claim—

1. The improvement in the manufacture of colored tops or slivers from combed animal fibers, the same consisting in winding a combed sliver in a twisted condition upon a suitable holder, then chemically treating the thus mounted sliver, and drying it.

2. The improvement in the manufacture of colored tops or slivers from combed animal fibers, the same consisting in winding a combed and twisted sliver upon a suitable holder, then chemically treating the thus mounted sliver and drying it and then untwisting the treated sliver.

3. The improvement in the manufacture of colored tops or slivers from combed animal fibers, the same consisting in winding a combed and twisted sliver upon a suitable holder, then chemically treating the thus mounted sliver and drying it, then untwisting the treated sliver and then combining and drawing two or more of said slivers into a single sliver.

4. The improvement in the manufacture of colored tops or slivers from combed animal fibers, the same consisting in winding a combed and twisted sliver upon a suitable holder, then chemically treating the thus mounted sliver and drying it, then untwisting the treated sliver and then combining, drawing and gilling two or more of said slivers into a single sliver.

5. The improvement in the manufacture of colored tops or slivers from combed animal fibers, the same consisting in winding a combed and twisted sliver upon a suitable holder, then chemically treating the thus mounted sliver and drying it, then untwisting the treated sliver from the holder, and then combining, drawing, gilling and balling two or more of said slivers into a top.

In testimony whereof I have affixed my signature in presence of two witnesses.

EMILE MAERTENS.

Witnesses:
GEO. H. REMINGTON,
IDA M. WARREN.